No. 765,164. Patented July 19, 1904.

UNITED STATES PATENT OFFICE.

JÜRGEN CALLSEN, OF ELBERFELD, GERMANY, ASSIGNOR TO FARBEN-FABRIKEN OF ELBERFELD CO., OF NEW YORK, N. Y., A CORPORATION OF NEW YORK.

META-TOLYLSEMICARBAZID.

SPECIFICATION forming part of Letters Patent No. 765,164, dated July 19, 1904.

Application filed April 2, 1904. Serial No. 201,341. (No specimens.)

*To all whom it may concern:*

Be it known that I, JÜRGEN CALLSEN, doctor of philosophy, chemist, of Elberfeld, Germany, (assignor to the FARBENFABRIKEN OF ELBERFELD COMPANY, of New York,) have invented a new and useful Improvement in Meta-Tolylsemicarbazid, of which the following is a specification.

My invention relates to the preparation of a new pharmaceutical product, which is chemically meta-tolylsemicarbazid of the formula

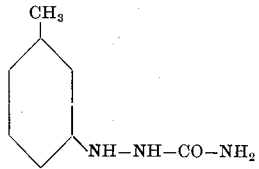

and which, according to my researches, possesses valuable therapeutic, especially antipyretic, properties, an average dose being between 0.25 and 0.75 gram.

The process for producing the new compound consists in treating meta-tolylhydrazin or salts thereof with cyanic acid or its salts. The meta-tolylsemicarbazid thus produced represents white lustrous crystals, melting at from 183° to 184° centigrade. It is only sparingly soluble in cold water, soluble in hot water and alcohol, and insoluble in ether. It reduces an aqueous solution of silver nitrate.

The following example will serve to illustrate the manner in which my invention can be carried into practical effect. The parts are by weight. To an aqueous solution of 158.5 parts of meta-tolylhydrazin hydrochlorid eighty-one parts of potassium cyanate dissolved in water are slowly added while stirring and cooling. The reaction takes place according to the following equation:

The meta-tolylsemicarbazid thus precipitated is filtered off and recrystallized from hot water or dilute alcohol, with the addition of bone-black.

Having now described my invention and in what manner the same is to be performed, what I claim as new, and desire to secure by Letters Patent, is—

The herein-described new meta-tolylsemicarbazid having the formula:

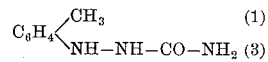

representing white lustrous crystals melting at from 183° to 184° centigrade, which are only sparingly soluble in cold water, soluble in hot water and alcohol and insoluble in ether; and reducing an aqueous solution of silver nitrate, substantially as hereinbefore described.

In testimony whereof I have signed my name in the presence of two subscribing witnesses.

JÜRGEN CALLSEN.

Witnesses:
OTTO KÖNIG,
J. A. RITTERSHAUS.